GAS-POWERED PISTOL

Original Filed March 20, 1967 3 Sheets-Sheet 1

INVENTORS.
JOHN F. VADAS
DONALD A. DESROCHERS
BY
ATTORNEY

GAS-POWERED PISTOL

Original Filed March 20, 1967 3 Sheets-Sheet 2

INVENTORS.
JOHN F. VADAS
DONALD A. DESROCHERS
BY B. Shlesinger
ATTORNEY

INVENTORS
JOHN F. VADAS
BY DONALD A. DESROCHERS
ATTORNEY

United States Patent Office

Re. 27,568
Reissued Jan. 30, 1973

27,568
GAS-POWERED PISTOL

John F. Vadas, Webster, and Donald A. Desrochers, Rochester, N.Y., by Crosman Arms Company, Inc., Fairport, N.Y., assignee Original No. 3,527,194, dated Sept. 8, 1970, Ser. No. 624,435, Mar. 20, 1967. Application for reissue Mar. 1, 1972, Ser. No. 230,774
Int. Cl. F41b *11/06*
U.S. Cl. 124—11 R 11 Claims

Matter enclosed in heavy brackets [ ] appears in the original patent but forms no part of this reissue specification; matter printed in italics indicates the additions made by reissue.

ABSTRACT OF THE DISCLOSURE

The pistol hand grip has a chamber holding a gas cartridge. This chamber is connected to a valve chamber. The valve chamber is connected to the gun barrel to deliver the gas behind a projectile therein. When the valve is seated it stops flow of gas to the barrel. A spring-activated hammer aligned with the valve, when released, opens the valve. A primary sear pivoted on the trigger and spring-pressed to holding position, holds the hammer cocked. A secondary sear integral with the trigger prevents accidental firing until the trigger is positively tripped. A screw permits fine adjustment of the primary sear.

BACKGROUND OF THE INVENTION

This invention relates to gas-powered guns, and more particularly to pistols employing replaceable gas cartridges to supply the propellant for firing projectiles therefrom.

Previous types of such guns have required a predetermined, generally fixed finger pressure to actuate their triggers. The trigger in the firing mechanism of a gun, can be made, for example, to require so little an operating movement that the mechanism may be regarded as "hair-trigger" sensitive; while another such gun may have a trigger which requires substantially more finger movement to operate the gun. The closer the gun approaches "hair-trigger" operation, the more important becomes its safety mechanism. Concomitant with the refinement of the operations of the trigger and safety mechanisms, is the desire to improve upon the efficiency of operation of the other moving parts of the gun, as well as the economy of construction of the weapon.

An object of this invention is to provide an improved gas-powered gun having a novel trigger mechanism that can be adjusted to increase or decrease, selectively, the trigger movement necessary to operate the gun.

Another object of this invention is to provide an improved safety mechanism for a gun of the type described. To this end, in addition to the usual safety and sear, a second sear is provided to prevent accidental firing.

Still another object of this invention is to provide a gun of the type described having improved means for conveying propellant gas from a supply thereof to the firing chamber of the gun.

Other objects of the invention will be apparent hereinafter from the specification and from the recital of the appended claims, particularly when read in conjunction with the accompanying drawings.

SUMMARY OF THE INVENTION

The pistol illustrated herein comprises a hollow hand grip for removably holding a gas-filled cartridge. A piercing mechanism removably mounted on the bottom of the grip includes a pointed piercing member, and a pivotable lever for forcing the pointed end of the piercing member through the cartridge cap to release gas therefrom. The gas passes to a chamber containing a normally-closed valve. A hammer reciprocates in the pistol forwardly of the valve between a cocked position in which it is spaced from the valve, and a released position in which it strikes the valve to open it temporarily, thereby to admit gas to the rear of a projectile in the barrel of the pistol. The hammer is releasably held in its cocked position by a primary sear which is pivoted on a trigger. A screw in the primary sear is adjustable to vary the trigger pressure required to effect release of the hammer from its cocked position; and a safety device for the trigger, and a secondary sear thereon, is held in either its "on" or "off" position by a spring-loaded detent.

Figure 1:
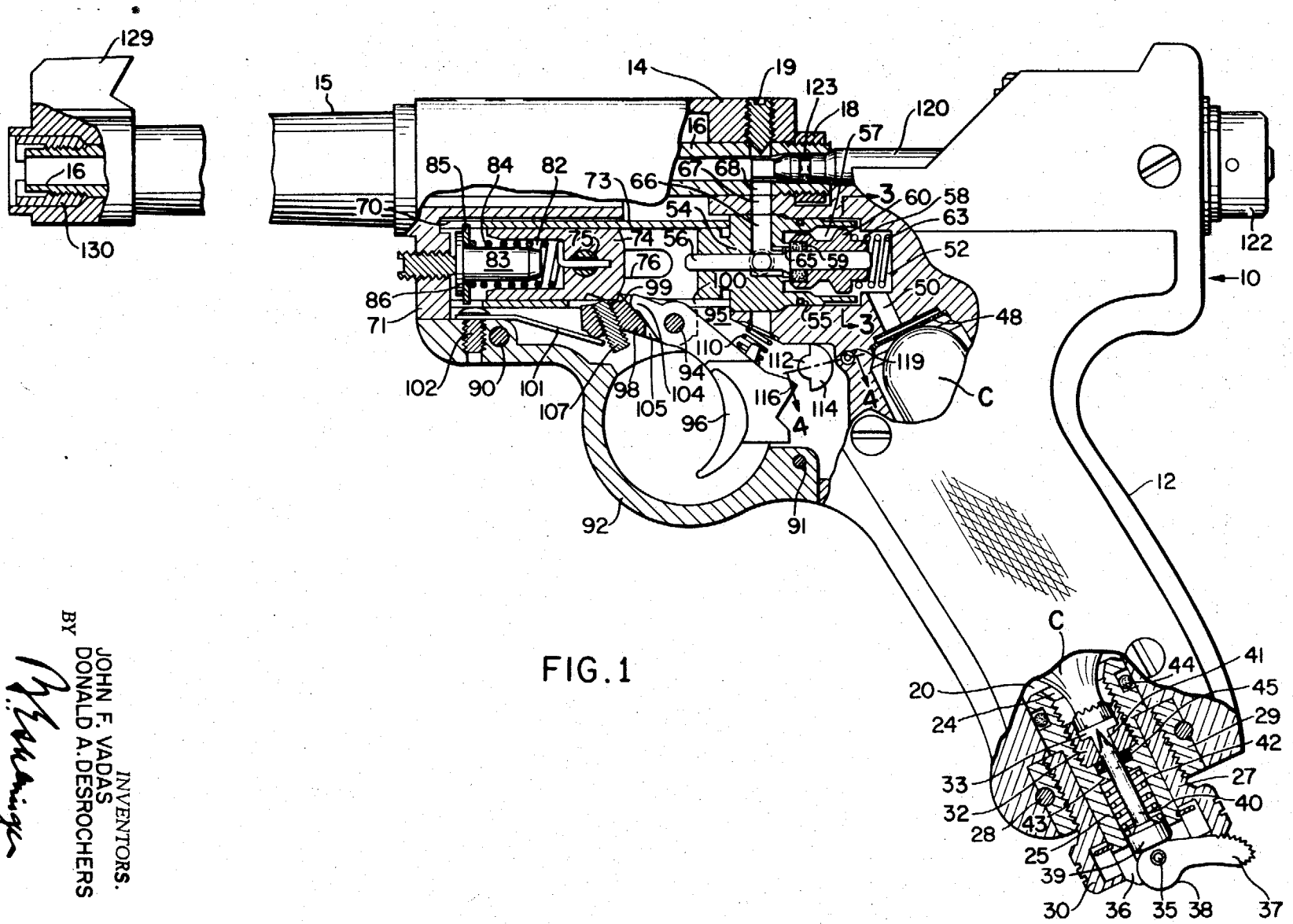
FIG. 1 is a side elevational view of a pistol made according to one embodiment of this invention, parts thereof being cut away and shown in section.

Referring now to the drawing by numerals of reference, the pistol comprises a frame 10 having an integral hand grip 12, and an integral breech 14 containing the barrel 16, and supporting the barrel housing 15. The barrel is removably secured in housing 15 by a knurled nut 18, which threads onto the rear end of the barrel to engage the front end of the breech 14, and by a set-screw 19 which threads through the breech into a hole in the barrel.

The grip 12 is formed with a chamber 20 removably to receive a conventional cartridge C containing gas ($CO_2$ or the like) under pressure. The lower, capped end of the cartridge is seated in a recess 33 formed in the inner end of a hollow plug 32. This plug is threaded into a recess formed in the inner end of a sleeve 25, which is removably secured in the lower end of the grip 12 by a removable fitting 27. Fitting 27 is retained over the outer end of sleeve 25, and is removably threaded into a hex nut 29 that is secured as by lock pins 28 in the lower end of the grip 12. Fitting 27 has an enlarged outer end or head 30 which extends beyond the lower end of the grip 12, and which may be manipulated to thread the fitting into, or to unthread it from nut 29.

Mounted to pivot on a pin 35 in a diametral slot 36 in the outer end of sleeve 25 is an arm 37. This arm has an eccentric, arcuate camming portion 38, which engages the head 39 of a piercing pin 40 that is reciprocable axially in the sleeve 25. Pin 40 has a pointed end which projects into the recess 33 through an opening 41 in the plug 32. Intermediate its end pin 40 is surrounded by a spring 42, which is housed in the sleeve 25, and which is disposed between a web 43 of the sleeve and the head 39 of the pin 40 to urge the pin 40 against the camming surface 38 on the arm 37.

Resilient O-rings 45 and 44, which surround the pin 40, and the sleeve 25, respectively, prevent escape of gas under pressure from the lower end of the chamber 20 once a cartridge C has been punctured.

The upper, closed end of a cartridge C is adapted to be seated near a resilient, foraminous disk or screen 48, which extends transversely across the lower end of a duct 50 in frame 10. Duct 50 connects the upper end of chamber 20 with the rear end of a chamber 52 formed in the frame 10 beneath the rear end of the breech 14.

Secured in this chamber is a hollow valve block 54, which carries a resilient O-ring 55 that engages the surrounding wall of a bore in the frame in which the valve block is secured. Mounted to reciprocate axially in a chamber 57 in the rear of block 54 is a valve 56, which carries a stem or guide 58 the forward end of which projects forwardly out of the block 54. A compression spring 63 is interposed between the rear end wall of chamber 52, and an enlarged intermediate section 60 of valve 56 to urge the valve forwardly toward a closed position. In this position a rubber annulus 59, that seats in the front face of the valve, and that surrounds valve stem 58 engages an annular valve seat 65, which is formed on the valve block 54 at the front of its chamber 57.

Figure 3:
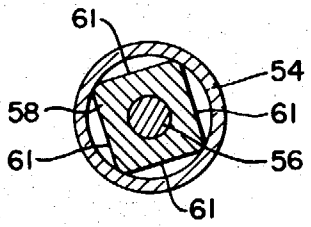
FIG. 3 is a fragmentary sectional view taken along the line 3—3 in FIG. 1 looking in the direction of the arrows.
Figure 5:
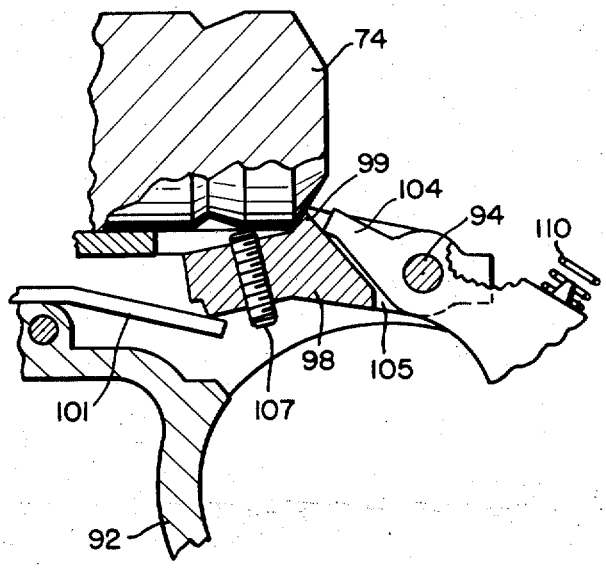
FIG. 5 is an enlarged, fragmentary view of the trigger, sear and hammer mechanism illustrated in FIG. 1.

Forwardly of the valve seat 65 the valve block 54 is formed with a right angular duct 66, which is of larger diameter than valve stem 58, and which is connected through an aligned duct 67 in breech 14 with a registering port 68 formed in the rear end of barrel 16. The portion 60 of the valve has plane side surfaces 61, and is generally square-shaped in cross section as shown in FIG. 3, but the corners of this section are rounded to engage and slide in the surrounding cylindrical internal wall of the valve block 54. The valve is so made in order that the gas may pass by the valve to the duct 66, when the valve is off its seat 65.

Secured at its rear end over the forward end of the valve block 54, and projecting at its forward end into a recess 70 formed in a lug 71, which projects downwardly from barrel housing 15 is a sleeve 73. Mounted to reciprocate in the sleeve 73 into and out of engagement with the valve stem 58 is a hammer 74. Hammer 74 carries a pin 75, opposite ends of which project through a pair of longitudinally extending slots 76 formed in diametrally opposite sides of the sleeve 73 and housing 14. For manipulating the hammer to move it to cocked position, a knurled knob 77 is secured to one end of the pin 75, and at its opposite end pin 75 has an integral knurled head 75' similar to knob 77.

Adjustably threaded into the lug or projection 71, and projecting into a recess 82 formed in the forward end of the hammer 74, is a stud 83. Surrounding the stud 83 is a compression spring 84, one end of which engages a washer 85, that seats against a circumferential shoulder or flange 86 formed on the stud 83, and the opposite end of which seats against the rear end of recess 82 in hammer 74. This latter end is fastened in pin 75.

Secured by screw 90 and pin 91 to the frame 10 is a trigger guard 92. Acting at its upper end to pivot on a pin 94, which is secured to the frame 10 and extends across a recess 95 formed in the underside of the frame above guard 92, is a trigger 96. Also mounted to pivot on pin 94 adjacent trigger 96 is a primary sear 98 having in its upper end a notch 99 engageable through a slot 100 in the underside of sleeve 73 with the rear end of hammer 74 to hold the latter in its cocked position. A leaf spring 101, which is secured at one end by a screw 102 to the forward, upper side of the trigger guard 92, serves to urge this primary sear 98 into locking position. A secondary sear 104, which is integral with the trigger 96, extends through a slot or recess 105 in the primary sear 98, and projects up through the slot 100. A set screw 107, which is adjustably threaded through the primary sear 98, is also engageable through the slot 100 with the hammer 74 for a purpose to be described below. The trigger 96 is urged to cocked position by a compression spring 110, which surrounds a boss on the trigger and is interposed between the trigger and the frame 10 in conventional manner.

Figure 4:
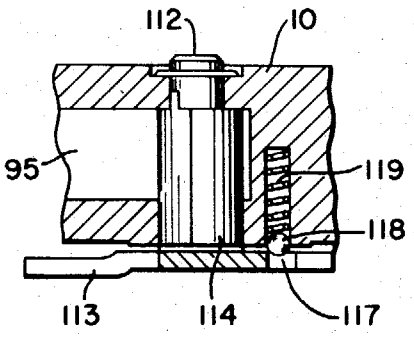
FIG. 4 is a fragmentary sectional view taken along the line 4—4 in FIG. 1 looking in the direction of the arrows.

Pivotally mounted in the frame 10 to extend transversely across the recess 95 adjacent the rear end of the trigger 96 is a shaft 112, to one end of which is secured a radial arm 113 (FIG. 4), which overlies the outside face of the frame 10 at one side thereof. Intermediate its end pin 112 is provided with an enlarged, semi-cylindrical camming surface 114 (FIGS. 1 and 4), which is pivotable by the arm 113 into, or out of, locking engagement with a projection 116 formed on the rear of the trigger 96. Housed in a recess in frame 10 rearwardly of pin 112 is a ball detent 118, which is urged by a compression spring 119 into engagement with one of two angularly spaced dimples 117 (only one of which is illustrated in the drawings), which are formed on the inside of arm 113 adjacent its rear end.

Slidably mounted in a recess formed in the frame 10 in breech 14 is a bolt 120, the forward end of which is slightly smaller in diameter than the bore of barrel 16. The bolt is movable into and out of the rear end of barrel 16 by a manually push-pull knob 122, which is secured to the rear end of the bolt. An O-ring 123 on the bolt prevents leakage of gases rearwardly along the bolt when the bolt is seated in the barrel.

Above the bolt 120, an adjustable rear sight 124 (FIG. 2) is secured by a screw 126 in a recess 128 formed in the top of the frame 10. The front sight 129 (FIG. 1) is integral with barrel housing 15. Barrel housing 15 and barrel 16 are drawn against and fastened to frame 10 by a jam nut 130.

For use, the lower end of the cartridge C is punctured by pivoting arm 37 about the pin 35 far enough to cause eccentric camming surface 38 to force the pointed end of the pin 40 through the cartridge cap. When the arm 37 is returned to the position illustrated in the drawing, the spring 42 returns the pin 40 to the position illustrated, thereby permitting gas under pressure to escape from the now-punctured cartridge, and into the sealed recess 20. This gas is admitted through the duct 50 to the chamber 52, the forward or left end of which is normally closed by the resilient annulus 59 seating on valve seat 65.

Figure 2:
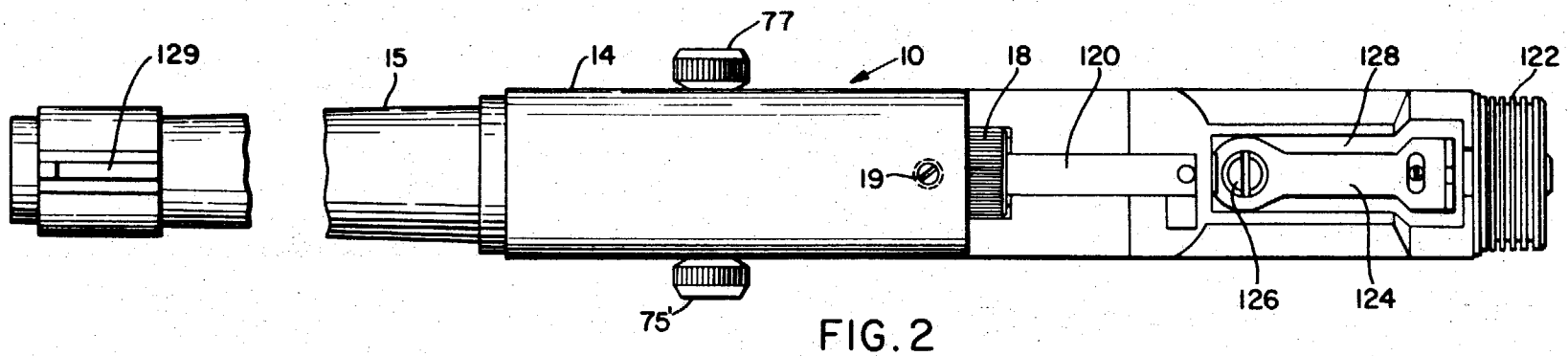
FIG. 2 is a plan view of this pistol.

In operation, the pistol is loaded by drawing bolt 120 rearwardly far enough to insert a projectile into the rear end of the barrel. The hammer 74 is then moved to its cocked position against the resistance of spring 84 by grasping the knobs 77 and 75' and pushing them forwardly until the notch 99 in the primary sear 98 engages the hammer 74 as illustrated in FIG. 1. During this movement the pin 75 is prevented from rotating or shifting axially in the block 74 by the right end (FIG. 1) of the spring 84, which extends through the pin 75, and into the hammer 74. The load on spring 84 may be adjusted by rotating the stud 83. The amount of movement necessary to operate the trigger 96 may be adjusted by adjusting set screw 107 in sear 98, which is accessible through the opening 95 in frame 10. This causes the inner end of the screw 107 to engage the hammer 74, and the sear 98 to pivot, independently of the trigger 96 and secondary sear 104, thereby varying the depth to which the peripheral edge of the hammer 74 projects into the notch 99.

To place the trigger on "safety," the arm 113 (FIG. 4) is pivoted to swing the semi-cylindrical camming surface 114 into contact with the projection 116 on the trigger, so that the trigger 96, and hence the secondary sear 104, cannot be pivoted far enough to permit the hammer 74 to be released from its cocked to its fired position. In both its released and its safety positions, the cam 114 is held against accidental movement by means of the spring loaded detent 118, which tends to hold the arm 113, and hence the cam 114, in one of its two positions of safety, or release, respectively.

If as a result of an accidental jolt or shock, the primary sear 98 should release the cocked hammer 74 while the trigger is on "safety," the secondary sear 104 will engaged and prevent the hammer 74 from moving to its fired position [upon subsequent release of the safety 11.]

When the safety 114 is in its released position as illustrated in FIG. 1, the trigger 96 may be squeezed against the resistance of spring 110, thereby causing secondary sear 104 to be pivoted about pin 94 (counterclockwise in FIG. 1) against the bottom of slot 105 in sear 98, thereby to swing primary sear 98 downwardly about pin 94, and out of slot 100 a distance sufficient to release the spring-loaded hammer 74 so that the hammer is driven suddenly into engagement with valve stem 58. The impact of the hammer against the valve stem effects momentary opening of the valve 56, so that the gas in chamber 52 passes into the bore 57 in valve block 54, and thence through duct 66 and 67 and registering port 68 to the rear of the projecticle disposed in the barrel 16, thereby causing the projectile to be expelled from the pistol.

With the hammer 74 in its fired position, the tension in the spring 84 is not sufficient to maintain the valve 56 open against the resistance of its associated spring 63, so that the valve returns to closed position.

The period of time that the valve is open, and hence the quantity of gas admitted to the firing chamber, can be varied by adjusting the tension on spring 84. After the weapon has been fired, it may be reloaded and recocked as above described.

To replace the gas cartridge C, the nut of fitting 27 may be threaded out of the ring 29, thereby withdrawing the sleeve 25. After a new gas cartridge has been inserted into chamber 20, the fitting 27 is threaded back into the ring 29. Thereafter the handle 37 may be pivoted to puncture the new cartridge.

From the foregoing it will be apparent that applicants have developed an improved gas-powered pistol, which is much more adaptable to the needs or desires of an individual than prior, like pistols. Heretofore to develop a "hair-trigger" operation of a pistol it has been necessary, as a general rule, to dismantle the pistol and file or otherwise remove material from the sear to reduce the trigger pressure necessary to operate the weapon. With applicants' pistol, however, the adjustment may be made merely by rotating the screw 107 in the desired direction. Moreover, in prior pistols it has been customary to manufacture the valve 56 in the form of a cylinder having an outside diameter quite a bit less than the inside diameter of the surrounding bore wall in which the valve reciprocates, so that gas admitted to the chamber 52 may pass freely between these confronting peripheral surfaces and out the forward end of the chamber when the valve is shifted to its open position. With applicants' novel valve, however, the chordal passages between the plane sides 61 and the surrounding wall of recess 57 provide adequate space for the gas to pass between the valve and the surrounding valve block to duct 66. Also the rounded four arcuate corners of the valve afford accurate guiding of the valve block in its reciprocatory movement.

Another advantages of applicants' novel pistol is the fact that the use of the resilient O-rings 47 and 55 provide such excellent sealing means at the lower end of the recess 20, and at the forward end of the recess 52, respectively, that it is not necessary to machine these recesses. Instead the frame 10 may be a die casting containing the chambers 20 and 52, and the cartridge piercing and valve assemblies may be inserted into these chambers without further machining thereof. In addition, the insertion of the right end (FIG. 1) of spring 84 through pin 75 serves to prevent rotational and axial movement in the latter, without requiring any special means for fixing the pin 75 in the hammer 74.

Furthermore, the provision of lever 37 makes piercing of the gas cartridge cap an easy matter.

While the invention has been described in connection with a specific embodiment thereof, it will be understood that it is capable of further modification, and this application is intended to cover any variations, uses, or adaptations of the invention following, in general, the principles of the invention and including such departures from the present invention as come within known or customary practice in the art to which the invention pertains and as may be applied to the essential features hereinbefore set forth, and as fall within the scope of the invention or the limits of the appended claims.

We claim:

[1. A gas-operated gun, comprising:

a frame having a barrel supported thereon;

a hammer mounted in said frame to reciprocate between cocked and firing positions;

a normal closed valve mounted in a chamber in said frame to be movable to open position by said hammer, when said hammer moves to firing position;

trigger means mounted on said frame including:

a movable sear releasably engageable with said hammer for holding said hammer in its cocked position;

a trigger for moving said sear from engagement with said hammer to release the latter, and manually adjustable means for adjusting the movement which must be imparted to said sear by said trigger to effect release of said hammer, said adjustable means comprising a screw threaded into said sear and also engageable with said hammer and adjustable relative to said sear selectively to increase and decrease, respectively, the distance said sear must be moved by said trigger to release said hammer.]

2. A gas-operated gun [as defined in claim 1, wherein] *comprising:*

*a frame having a barrel supported thereon;*

*a hammer mounted in said frame to reciprocate between cocked and firing positions;*

*a normally-closed valve mounted in a chamber in said frame to be movable to open position by said hammer, when said hammer moves to firing position;*

*trigger means mounted on said frame including:*

*a movable sear releasably engageable with said hammer for holding said hammer in its cocked position;*

*a trigger for moving said sear from engagement with said hammer to release the latter; and*

*manually adjustable means for adjusting the movement which must be imparted to said sear by said trigger to effect release of said hammer, said adjustable means comprising a screw threaded into said sear and also engageable with said hammer and adjustable relative to said sear selectively to increase and decrease, respectively, the distance said sear must be moved by said trigger to release said hammer,* said trigger and said sear *being* [are] mounted to pivot about a common axis in one direction to effect release of said hammer, and in the opposite direction to engage said sear with said hammer, when the latter is moved to its cocked position, spring means constantly *urging* [urges] said sear about said axis to hammer-engaging position, and said screw [is] *being* adjustable to engage said hammer and limit the pivotal movement of said sear in said opposite direction.

3. A gas-operated gun comprising:

a frame having a barrel supported thereon;

a hammer mounted in said frame to reciprocate between cocked and firing positions;

a normally-closed valve mounted in a chamber in said frame to be movable to open position by said hammer, when said hammer moves to firing position;

trigger means mounted on said frame including:

a movable sear releasably engageable with said hammer for holding said hammer in its cocked position;

a trigger for moving said sear from engagement with said hammer to release the latter;

manually adjustable means for adjusting the movement which must be imparted to said sear by said trigger to effect release of said hammer;

said adjustable means comprising a screw threaded into said sear and engageable with said hammer and adjustable relative to said sear to vary the distance said sear must be moved by said trigger to release said hammer;

said trigger and said sear being mounted to pivot about a common axis in one direction to effect release of said hammer, and in the opposite direction to engage said sear with said hammer, when the latter is moved to its cocked position;

spring means constantly urging said sear about said axis to hammer-engaging position;

said screw being adjustable to limit the pivotal movement of said sear in said opposite direction; and means mounting said sear and said trigger for pivotal movement independently of one another about said axis.

4. A gas-operated gun as defined in claim 3, wherein:

said trigger has integral therewith a second sear, which is engageable with the first-named sear to transmit the pivotal movement of said trigger in said one direction to said first-named sear, said first-named sear has thereon a notch, one side of which overlies one end of said hammer to hold the latter in its cocked position, said spring urges said first-named sear in said opposite direction, and said screw is adjustable to pivot said first-named sear in said one direction independently of said trigger to reduce the extent to which said one side of said notch overlies said one end of said hammer.

5. A gas-operated gun as defined in claim 4, having a safety mechanism including:

a second pin on said frame adjacent the end of said trigger remote from said second sear;

a cam pivotal about the axis of said second pin between an operative position in which it engages said trigger to prevent the pivotal movement thereof in said one direction, and an inoperative position in which it is disengaged from said trigger; and resilient detent means releasably holding said cam in its operative and its inoperative positions, respectively.

6. A gas-operated gun comprising:

a frame having a barrel supported thereon;

a hammer mounted in said frame to reciprocate between cocked and firing positions:

a normally-closed valve mounted in a chamber in said frame to be movable to open position by said hammer, when said hammer moves to firing position;

trigger means mounted on said frame including:

a movable sear releasably engageable with said hammer for holding said hammer in its cocked position;

a trigger for moving said sear from engagement with said hammer to release the latter; and manually adjustable means for adjusting the movement which must be imparted to said sear by said trigger to effect release of said hammer;

a spring interposed between said hammer and said frame to urge said hammer constantly toward its firing position;

a cocking pin extending transversely through said hammer to the exterior of said frame and manually operable to move said hammer from its firing to its cocked position; and one end of said spring extending transversely through said cocking pin to secure said cocking pin against movement relative to said hammer.

7. A gas-operated gun as defined in claim 6, including means operable from the exterior of said gun for adjusting the tension in said spring.

8. A gas-operated gun comprising:

a frame having a barrel supported thereon;

a hammer mounted in said frame to reciprocate between cocked and firing position;

a normally-closed valve mounted in a chamber in said frame to be movable to open position by said hammer, when said hammer moves to firing position;

trigger means mounted on said frame including:

a movable sear releasably engageable with said hammer for holding said hammer in its cocked position;

a trigger for moving said sear from engagement with said hammer to release the latter, and manually adjustable means for adjusting the movement which must be imparted to said sear by said trigger to effect release of said hammer;

said chamber being circular in cross section, and communicating at opposite ends thereof with gas inlet and outlet ports, respectively, that are formed in said frame;

said valve having intermediate its ends a guide portion disposed in coaxial sliding engagement with the surrounding wall of said chamber; and said guide portion being generally rectangular in cross section but having arcuate corners which engage and slide on the interior circular cross-sectional wall of said chamber.

[9. A gas-operated gun comprising:

a frame having a barrel supported thereon;

a hammer mounted in said frame to reciprocate between cocked and firing positions;

a normally-closed valve mounted in a chamber in said frame to be movable to open position by said hammer, when said hammer moves to firing position;

trigger means mounted on said frame including:

a movable sear releasably engageable with said hammer for holding said hammer in its cocked position;

a trigger for moving said sear from engagement with said hammer to release the latter; and manually adjustable means for adjusting the movement which must be imparted to said sear by said trigger to effect release of said hammer; and said adjustable means comprising a member interposed between said hammer and said sear, and adjustable from the exterior of said frame to shift said sear relative to said hammer.]

*10. A gas-operated gun including: a frame having a barrel supported thereon; a hammer mounted in said frame to reciprocate between cocked and firing positions; a normally-closed valve mounted in a chamber in said frame to be movable to open position by said hammer, when said hammer moves to firing position; trigger means mounted on said frame including: a movable sear releasably engageable with said hammer for holding said hammer in its cocked position; a trigger for moving said sear from engagement with said hammer to release the latter; and manually adjustable means for adjusting the movement which must be imparted to said sear by said trigger to effect release of said hammer, wherein the improvement comprises:*

*said adjustable means comprising a screw threaded into said sear and also engageable with said hammer and adjustable relative to said sear selectively to increase and decrease, respectively, the distance said sear must be moved by said trigger to release said hammer;*

*said trigger and said sear being mounted to pivot independently about a common axis in one direction to effect release of said hammer, and in the opposite direction to engage said sear with said hammer, when the latter is moved to its cocked position,*

*spring means constantly urging said sear about said axis to hammer-engaging position, and*

*said screw being adjustable to engage said hammer and limit the pivotal movement of said sear in said opposite direction.*

*11. A gas-operated pistol including: a frame having a barrel supported thereon; a hammer mounted in said frame to reciprocate between cocked and firing positions; a normally-closed valve mounted in a chamber in said frame to be movable to open position by said hammer, when said hammer moves to firing position; trigger means mounted on said frame including a movable sear releasably engageable with said hammer for holding said hammer in its cocked position; a trigger for moving said sear from engagement with said hammer to release the latter; and manually adjustable means for adjusting the movement which must be imparted to said sear by said*

*trigger to effect release of said hammer, wherein the improvement comprises:*

*said adjustable means comprising a member interposed between said hammer and said sear, and adjustable from the exterior of said frame to shift said sear relative to said hammer, said shifting selectively increasing or decreasing the engagement between said sear and said hammer to vary the pressure required to activate said trigger means; and*

*second sear means providing a safety engagement with said hammer to prevent accidental firing of said hammer on disengagement from said first-named sear without the activation of said trigger means.*

*12. A gas-operated pistol as defined in claim 11 wherein the improvement further comprises:*

*said adjustable means comprising a screw threaded into said first sear and engageable with said hammer and adjustable relative to said first sear to vary the distance said first sear must be moved by said trigger to release said hammer;*

*said trigger and said first sear being mounted to pivot about a common axis in one direction to effect release of hammer, and in the opposite direction to engage said first sear with said hammer, when the latter is moved to its cocked position;*

*spring means constantly urging said first sear about said axis to hammer-engaging position;*

*said screw being adjustable to limit the pivotal movement of said first sear in said opposite direction; and*

*means mounting said first sear and said trigger for pivotal movement independently of one another about said axis.*

*13. A gas-operated pistol as defined in claim 12 wherein the improvement further comprises:*

*said second sear means being integral with said trigger means and is engageable with said first sear to transmit the pivotal movement of said trigger means in said one direction to said first sear;*

*said first sear having thereon a notch one side of which overlies one end of said hammer to hold the latter in its cocked position;*

*said spring means urging said first sear in said opposite direction;*

*said screw being adjustable to pivot said first sear in said one direction independently of said trigger to reduce the extent to which said one side of said notch overlies said one end of said hammer; and*

*second spring means urging said trigger to cocked position with said first sear in engagement with said hammer and said second sear means ready for said safety engagement with said hammer.*

References Cited

The following references, cited by the Examiner, are of record in the patented file of this patent or the original patent.

UNITED STATES PATENTS 1,741,281 12/1929 Burton ---------- 42—69 A

ANTON O. OECHSLE, Primary Examiner

R. T. STOUFFER, Assistant Examiner

U.S. Cl. X.R.

124—37; 42—69 A